United States Patent [19]

Neuenschwander

[11] Patent Number: 4,583,368

[45] Date of Patent: Apr. 22, 1986

[54] WATER-POWERED HYDRAULIC MOTOR

[76] Inventor: Victor L. Neuenschwander, Box 1098, Bloomfield, N. Mex. 87413

[21] Appl. No.: 758,396

[22] Filed: Jul. 24, 1985

[51] Int. Cl.⁴ ............................................. F03G 3/00
[52] U.S. Cl. ........................................ 60/639; 60/398
[58] Field of Search ............... 91/4; 60/398, 495, 496, 60/497, 502, 503, 505, 639

[56] References Cited

U.S. PATENT DOCUMENTS

| | | |
|---|---|---|
| 416,033 | 11/1889 | Garrett Jr. |
| 459,280 | 9/1891 | Garrett Jr. |
| 562,721 | 6/1896 | Garrett Sr. |
| 940,312 | 11/1909 | Hanson. |
| 2,129,292 | 9/1938 | Vinson. |
| 2,150,293 | 3/1939 | Push. |
| 3,234,853 | 2/1966 | Aber ........................................ 91/4 |
| 3,485,038 | 12/1969 | Martin et al. ........................ 60/503 |
| 4,034,565 | 6/1977 | McVeigh ............................... 60/503 |
| 4,207,741 | 6/1980 | Rainey ................................... 60/503 |

Primary Examiner—Allen M. Ostrager
Attorney, Agent, or Firm—Harvey B. Jacobson

[57] ABSTRACT

A hydraulic power system for operating a rotary-hydraulic motor includes a pair of hydraulic piston/cylinder assemblies each disposed in vertical disposition below a common water source and having cylinder heads interconnected by hydraulic delivery and supply conduits in a closed circuit including the motor which is operated by forward and reverse flow of liquid through the circuit effected by alternative rising and lowering of the respective pistons. The upper ends of the respective pistons are provided with water tanks which are filled from the water source and emptied into respective discharge tanks sequentially to provide the raising and lowering movements of the pistons. The system further includes various valve devices in the closed hydraulic circuit and in association with the water source and piston and discharge tanks for controlling the respective liquid flows in a manner providing the cyclical alternative reciprocation of the respective pistons.

9 Claims, 5 Drawing Figures

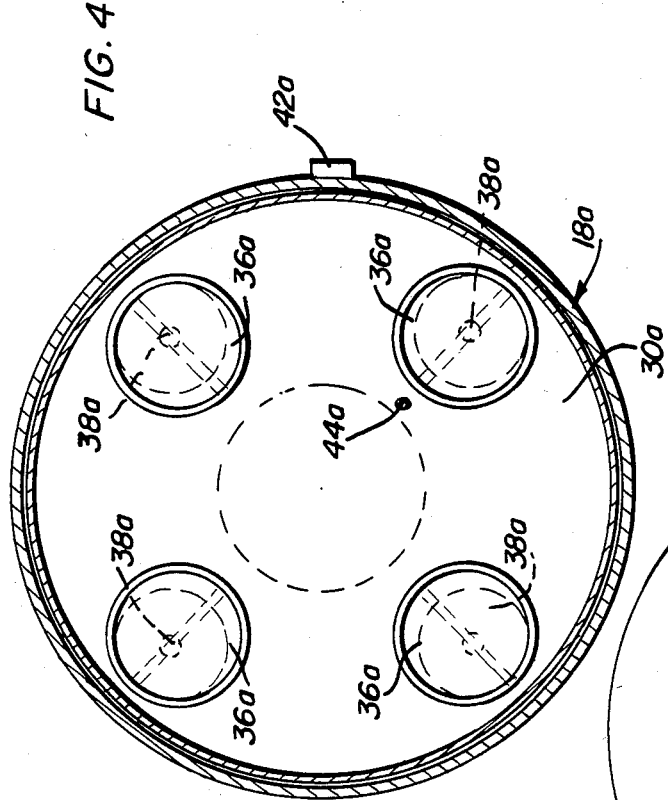
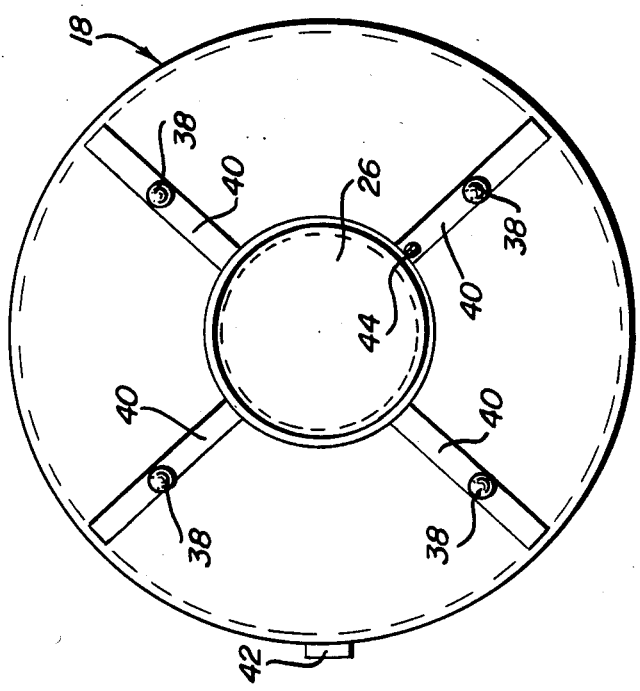
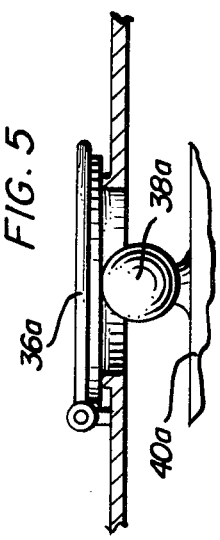
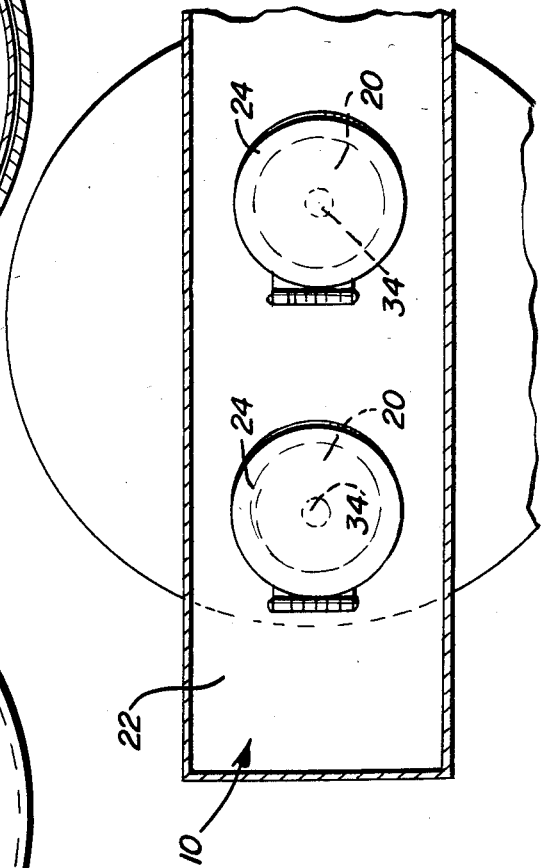

WATER-POWERED HYDRAULIC MOTOR

BACKGROUND AND SUMMARY OF THE INVENTION

This invention relates to a low cost, self-contained system for driving a rotary hydraulic motor or the like, which requires only a supply of water in a water reservoir, tank or the like, as a power source.

Thus, the power system in accordance with the invention includes a pair of hydraulic cylinder assemblies each disposed in vertical disposition below a common water source, the respective cylinder heads being interconnected by hydraulic delivery and supply conduits in a clossd circuit including a rotary hydraulic motor or like driven member which is operated by forward and reverse flow of liquid through the circuit effected by respective flow cycles each comprising sequential filling of one cylinder with the liquid and raising of its piston accompanied by lowering of the other piston and emptying of its cylinder followed by emptying of the one cylinder and filling of the other, the upper ends of the respective pistons being provided with water tanks which are filled from said water source and emptied into respective discharge tanks sequentially in each cycle to provide lowering and allow raising of the pistons respectively in their respective cylinders. The system further includes various valve devices in the closed hydraulic circuit and in association with the water source and pistons and discharge tanks for controlling the respective liquid flows in a manner effecting cyclical reciprocation of the respective pistons as aforesaid.

The system is substantially maintenance free, and can provide continuous low cost operation of a rotary hydraulic motor, for example, which can be used inter alia to drive an electric generator, or as a direct power source. No fuel or outside power is required for the system which includes a minimum of moving parts.

STATEMENT OF PRIOR ART

Applicant is aware of the following U.S. patents pertaining to hydraulic motor devices and the like. None of the patents, however, discloses a power system having the features of the present invention.

| | | |
|---|---|---|
| 416,033 | J. W. Garrett, Jr. | Nov. 26, 1889 |
| 459,280 | J. W. Garrett, Jr. | Sept. 8, 1891 |
| 562,721 | J. W. Garrett, Jr. | June 23, 1896 |
| 940,312 | J. Hanson | Nov. 16, 1909 |
| 2,129,292 | E. E. Vinson | Sept. 6, 1938 |
| 2,150,293 | B. J. Pugh | Mar. 14, 1939 |

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a sectional view on line 2—2 of FIG. 1.

FIG. 3 is a sectional view on line 3—3 of FIG. 1.

FIG. 4 is a sectional view on line 4—4 of FIG. 1.

FIG. 5 is a detail view of a valve mechanism used in the system.

DESCRIPTION OF THE PREFERRED EMBODIMENT

Figure 1:
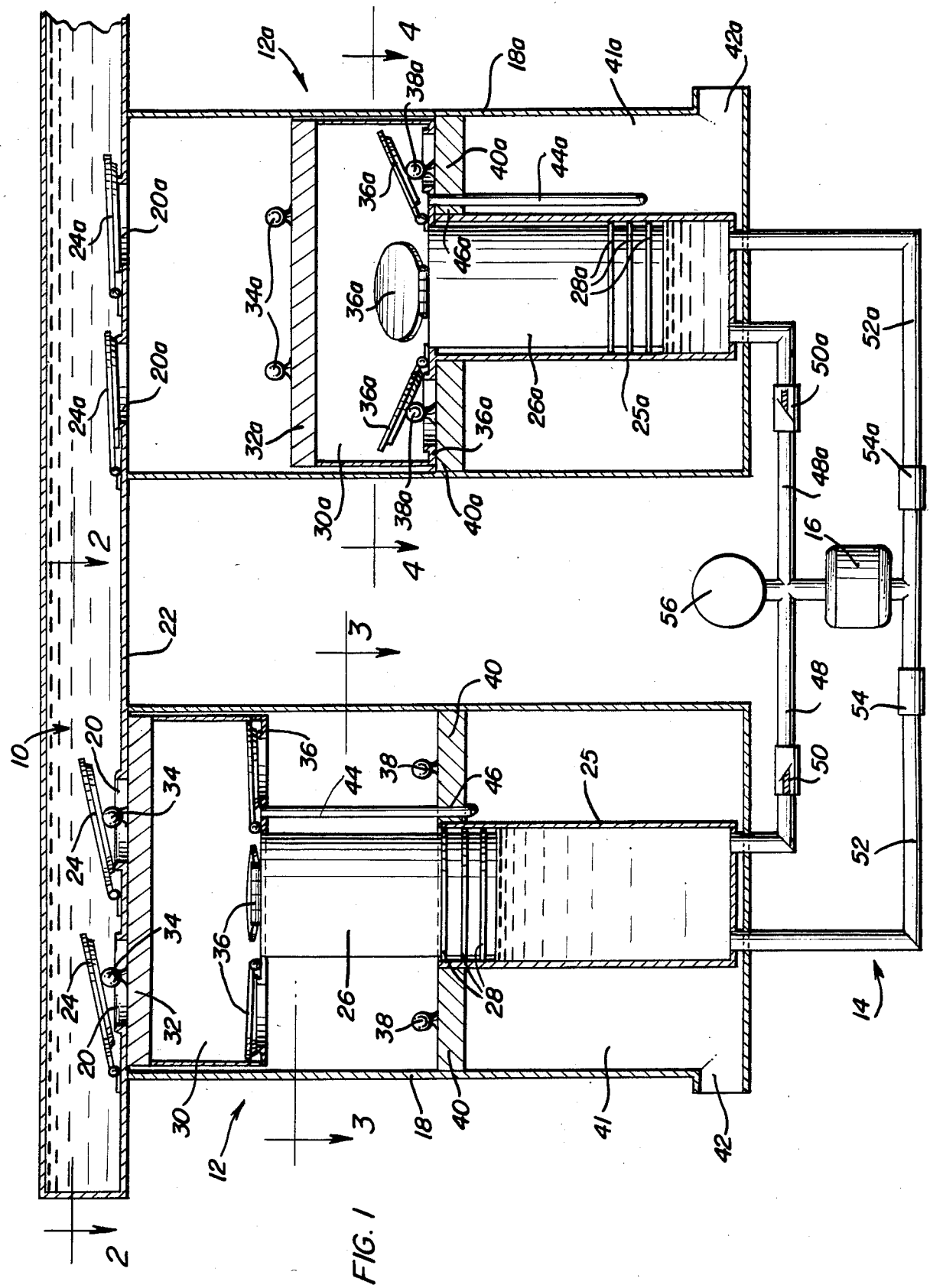
FIG. 1 is a somewhat diagrammatic elevational view of a hydraulic power system in accordance with the invention.

Generally speaking, a hydraulic power system, as seen more particularly in FIG. 1, comprises a water reservoir 10 which may be supplied with water from any convenient source, such as a river, stream or the like, a pair of power assemblies 12, 12a driven by water from the reservoir, and a hydraulic circuit 14 including a rotary hydraulic motor 16 operated by liquid flow through the circuit induced by operation of the power assemblies.

In greater detail, each power assembly includes an outer tank 18, 18a which at its upper end is adapted to communicate with respective pairs of openings 20, 20a in base wall 22 of reservoir 10, such openings being associated with respective flap-type valves 24, 24a which control the flow of water from reservoir 10 into the respective power assemblies. At the base of each outer tank 18, 18a, is a centrally located hydraulic cylinder 25, 25a for hydraulic circuit fluid, the cylinders receiving respective pistons 26, 26a having respective piston rings 28, 28a. At the top of each piston there is provided an open-topped water tank 30, 30a which conforms substantially to the diameter of the respective outer tanks 18, 18a. Each of the water tanks 30, 30a has a cross-bar 32, 32a at the top with ball studs 34, 34a which are aligned with the respective flap valves 24, 24a so as to engage and open the valves when the respective piston is at the top of its stroke (as shown for piston 26 in FIG. 1) to allow water from the reservoir 10 to flow into the respective water tanks 30, 30a. The base wall of the respective water tank 30, 30a is provided with four flap valves 36, 36a for engaging respective ball studs 38, 38a on cross-bars 40, 40a around the top of the respective cylinders 25, 25a so that when the respective pistons 26, 26a descend to the their respective lowermost positions, the ball studs 38, 38a engage and open the respective flap valves 36, 36a allowing water from the respective water tanks 30, 30a to discharge into respective discharge portions 41, 41a of tanks 18, 18a for discharge through respective outlets 42, 42a. Piston 26a is shown in the lowermost position in FIG. 1. Each piston assembly has a guide rod 44, 44a depending from the respective water tank 30, 30a through an opening 46, 46a in cross-bars 40, 40a to maintain the angular alignment of the respective flap valves and ball studs.

Hydraulic circuit 14 includes a first outlet conduit 48 connecting the bottom of cylinder 25 (the cylinder head in effect) with motor 16 and including a spring-loaded one-way valve 50 allowing liquid to flow only from cylinder 25 to the motor; a second similar outlet conduit 48a connecting the bottom of cylinder 25a with motor 16 and including a spring-loaded one-way valve 50a allowing liquid to flow only from cylinder 25a to motor; a first return conduit 52 connecting the motor to the bottom of cylinder 25 and including a one-way valve 54 allowing liquid to flow only from motor 16 into cylinder 25; a second return conduit 52a connecting the motor to the bottom of cylinder 25a and including a one-way valve 54a allowing liquid to flow only from motor 16 into the cylinder 25a; and a hydraulic accumulator 56 associated with the motor for maintaining pressure flow through the motor during stroke reversals of the respective pistons.

In operation, when piston 26 is at the top of its stroke, piston 26a is at the bottom, as shown in FIG. 1. Flap valves 24 are opened by means of the ball studs 34 so that water tank 30 is being filled from reservoir 10, while flap valves 36a are opened by ball studs 38a so that tank 30a is emptying into discharge portion 40a of tank 18a. Since there are four flap valves 36a and only two flap flaps 24, tank 30a empties faster than tank 30 fills.

When the weight of water in tank 30 is sufficient to overcome the spring force of valve 50 and the head of liquid in cylinder 25, piston 26 descends (tank 30a now being empty) so that liquid from cylinder 25 is caused to flow through conduit 48, motor 16 and conduit 52a into cylinder 25a thereby operating the motor and raising piston 26a. This condition is maintained until piston 26 reaches the bottom of its stroke and piston 26a reaches the top. Then, tank 30 is emptied by engagement of ball studs 38 engaging flap valves 36 while tank 30a is filled by ball studs 34a engaging flap valve 24a. When tank 30a is filled, the cycle is reversed, with piston 26a falling in cylinder 25a and piston 26 rising in cylinder 25 liquid flowing through conduit 48a to motor 16 and from motor 16 through conduit 52 into cylinder 25. During stroke reversals of the pistons, accumulator 56 maintains pressure on the motor which includes known means for obtaining unidirectional rotation throughout a cycle of the respective pistons. The apparatus will operate continuously as long as there is a sufficient water supply to reservoir 10. The system moreover, lends itself to stacking or staging of power assemblies one below another with discharge water from an upper assembly being used to operate a lower assembly.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A hydraulic power system for operating a rotary hydraulic motor or like driven member comprising a pair of hydraulic piston/cylinder assemblies each disposed in vertical disposition below a water reservoir, the respective cylinder heads being interconnected by hydraulic delivery and supply conduits in a closed circuit including the driven member, for operation of the driven member by forward and reverse flow of liquid through the circuit effected by repetitive flow cycles each comprising sequential filling of one cylinder with liquid from the circuit and raising of its piston accompanied by lowering of the other piston and emptying of its cylinder into the circuit followed by emptying of the one cylinder and filling of the other, the respective pistons each having an upper end formed as a water tank for filling from said reservoir when the piston is in an uppermost position through first valve means connected between the reservoir and the tank, and for emptying to a discharge means when the piston is in a lowermost position through second valve means connected between the water tank and the discharge means, the filling and emptying of the respective water tanks providing motive power for raising and lowering the pistons as aforesaid to produce the flow cycles.

2. The invention of claim 1 wherein the circuit comprises delivery conduits leading from the respective cylinders to the driven member, each delivery conduit including a spring-loaded non-return valve allowing liquid to flow therethrough only in a direction from the respective cylinder to the driven member, and supply conduits leading from the driven member to the respective cylinders, each supply conduit including a one-way valve allowing liquid to flow therethrough only in a direction from the driven member to the respective cylinder.

3. The invention of claim 2 wherein the circuit includes a hydraulic accumulator for maintaining pressure on the driven member during stroke reversals of the respective pistons.

4. The invention of claim 1 wherein the water tanks are of larger cross-dimension than the respective pistons and the respective discharge means comprise respective outer tanks surrounding the respective cylinders.

5. The invention of claim 4 wherein the respective first valve means comprises first flap valves in a base wall of the reservoir and first abutment means associated with the respective water tanks for engaging and opening the first flap valves when the respective piston is in uppermost position and allowing water to flow from the reservoir into the respective water tank, the first flap valves being closed when the respective piston is lowered.

6. The invention of claim 5 wherein the first abutment means comprises first ball studs mounted on a cross-bar at the top of the respective water tank.

7. The invention of claim 5 wherein the second valve means comprises second flap valves in a base wall of the respective water tank and second abutment means associated with the respective discharge tank for engaging and opening the second flap valves when the respective piston is in the lowermost position so as to empty the respective water tank into the respective discharge tank.

8. The invention of claim 7 wherein the second abutment means comprises second ball studs on support means disposed around the tops of the respective cylinders.

9. The invention of claim 8 wherein each water tank includes a guide rod extending from the base thereof through an opening in the respective support means for maintaining angular alignment as between the respective flap valves and ball studs.

* * * * *